United States Patent
Friedrich

(10) Patent No.: US 7,490,585 B2
(45) Date of Patent: Feb. 17, 2009

(54) BALANCE SHAFT FOR A RECIPROCATING PISTON ENGINE

(75) Inventor: Christian Friedrich, Graz (AT)

(73) Assignee: Magna Drivetrain AG & Co KG, Lannach (AT)

( * ) Notice: Subject to any disclaimer, the term of this patent is extended or adjusted under 35 U.S.C. 154(b) by 196 days.

(21) Appl. No.: 10/534,568

(22) PCT Filed: Nov. 12, 2003

(86) PCT No.: PCT/AT03/00340

§ 371 (c)(1), (2), (4) Date: Feb. 17, 2006

(87) PCT Pub. No.: WO2004/044452

PCT Pub. Date: May 27, 2004

(65) Prior Publication Data

US 2006/0137645 A1 Jun. 29, 2006

(30) Foreign Application Priority Data

Nov. 12, 2002 (AT) .............................. GM 764/2002

(51) Int. Cl.
  *F02B 75/06* (2006.01)
  *F16C 3/00* (2006.01)
(52) U.S. Cl. .................................... 123/192.2; 464/180
(58) Field of Classification Search ............... 123/45 R, 123/45 A, 192.1, 192.2; 464/180
See application file for complete search history.

(56) References Cited

U.S. PATENT DOCUMENTS

| 3,667,317 A | | 6/1972 | Hillingrathner | |
|---|---|---|---|---|
| 3,680,608 A | * | 8/1972 | Emmerich et al. | ............ 30/381 |
| 4,282,836 A | * | 8/1981 | Fox et al. | ............ 123/146.5 A |
| 4,510,894 A | * | 4/1985 | Williams | .................. 123/48 R |
| 4,953,517 A | * | 9/1990 | McGovern et al. | ........ 123/559.1 |
| 6,854,358 B1 | * | 2/2005 | Stuckler | ...................... 74/603 |

FOREIGN PATENT DOCUMENTS

| DE | 103 52 775 A1 | * | 6/2004 |
|---|---|---|---|
| JP | 2000-283238 A | * | 10/2000 |
| WO | WO 01/29447 | | 4/2001 |

* cited by examiner

*Primary Examiner*—Stephen K Cronin
*Assistant Examiner*—Ka Chun Leung
(74) *Attorney, Agent, or Firm*—Harness, Dickey & Pierce, P.L.C.

(57) ABSTRACT

In a compensating shaft for reciprocating piston engines with at least one compensating weight (22) connected torsionally elastically to the compensating shaft (21), effective noise reduction is achieved by using an elastic element, preferably one (25) made of plastic of elasticity which is graduated in the circumferential direction, the hard central part (26) having a connection (15) to the compensating shaft (11) which is firm in the circumferential direction, and the soft part (31) bearing against the compensating weight (22).

16 Claims, 2 Drawing Sheets

BALANCE SHAFT FOR A RECIPROCATING PISTON ENGINE

BACKGROUND OF THE INVENTION

The invention relates to a compensating shaft for reciprocating piston engines with at least one compensating weight with an eccentric center of gravity, the compensating weight being connected torsionally elastically to the compensating shaft. In modern internal combustion engines, compensating shafts are used to reduce vibrations and running noises. However, their effect and success is satisfactory only when the compensating shaft unit itself also runs in a quiet and vibration-free way.

Vibrations of the compensating shaft unit can be excited by the moving masses of the engine and by its rotational irregularity. The latter are, on account of the clearances in their drive and the small torque transmitted via it, a noise source which is particularly difficult to control; moreover, great load with a changing sign is exerted on the teeth by virtue of the rotational irregularity. Minimizing the tooth clearances is problematic on account of the temperature differences arising and increases manufacturing costs enormously.

It is known to provide the driving toothed wheel on the crankshaft of the engine with an elastic connection between the toothed ring and the wheel body, for instance from U.S. Pat. No. 3,667,317, but this isolation from excitation by the crankshaft allows the masses of the entire compensating shaft unit the freedom to vibrate.

It is furthermore known from JP 2000-283238 AA to provide a torsionally elastic connection between a compensating weight and a bushing made as a hollow shaft. This connection consists of rubber, which is fitted between claws in the interior of the compensating weight and external claws of the bushing.

It is therefore an object of the invention to achieve effective noise reduction in a compensating shaft unit by torsionally elastic connection to the compensating shaft with minimum manufacturing costs (simple assembly included).

SUMMARY OF THE INVENTION

According to the invention, the foregoing object is achieved by virtue of the fact that the compensating weight surrounds the compensating shaft with its edge zones (as described in WO 01/29447 A1) and a window is formed therebetween in the longitudinal direction, in which an elastic element is provided, which is supported on the compensating shaft in the circumferential direction. The connection is thus soft in the circumferential direction and hard in the radial direction, which is desirable on account of the unbalance. In addition to the other advantages, the window moreover allows enough space for a spring damper unit or for an elastic element made of plastic. The latter makes it possible to produce a compensating weight with a closed cylindrical contour, which minimizes its splashing losses. The fact that only the compensating masses themselves vibrate freely affords a reduction of the tooth entry impacts on the driving toothed wheels and quieter running.

In an especially good development, the elastic element is made of plastic of elasticity which is graduated in the circumferential direction, the hard central part having a connection to the compensating shaft which is firm in the circumferential direction. Above all, this brings about a progressive spring rate, which firstly allows free dying out but secondly limits the amplitude.

In an advantageous embodiment, the plastic part is manufactured by injection molding, the connection to the compensating shaft consisting of a co-injected root projecting into a transverse bore of the shaft. This makes simple manufacture and rapid mounting of the plastic part in the compensating weight possible. For this purpose, the root can comprise a metal reinforcement.

BRIEF DESCRIPTION OF THE DRAWINGS

The invention is described and explained below with reference to diagrams, where.

DETAILED DESCRIPTION

Figure 1:
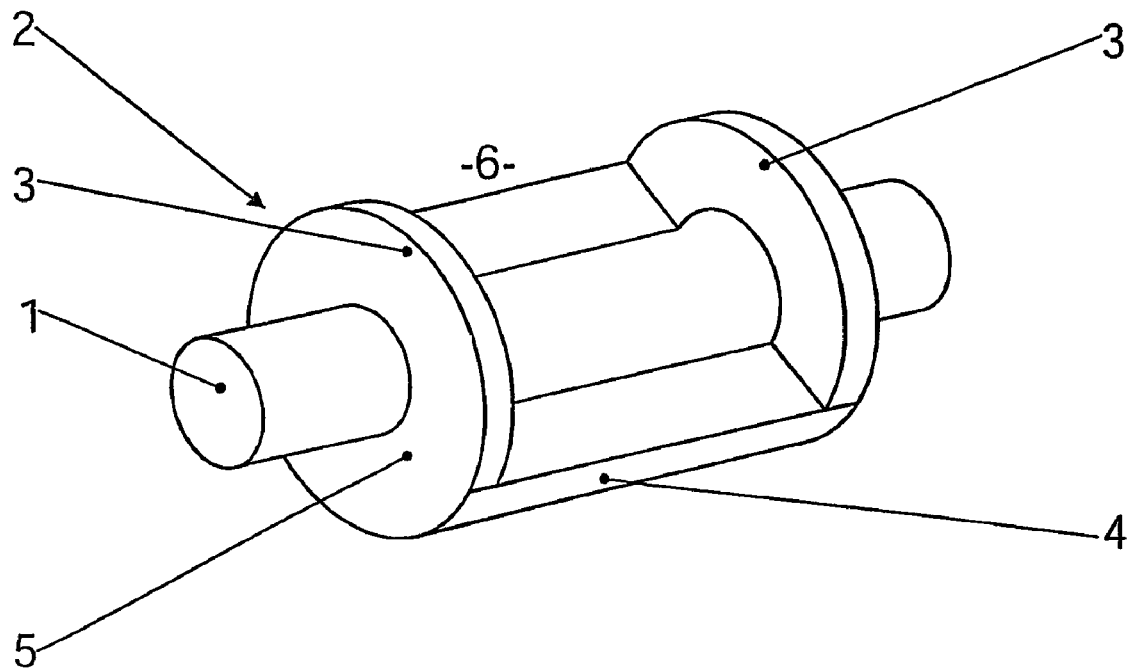
FIG. 1 shows a first embodiment in an axonometric view.

In FIG. 1, a shaft is designated by 1 and a compensating weight by 2. The two together form a compensating shaft, which can also have more than one compensating weight 2. Here, the compensating weight 2 is of the type known from WO 01/29447, with two edge zones 3, which surround the shaft 1 like suspenders, and an eccentric unbalance mass 4. A window 6 is thus formed on that side of the shaft 1 facing away from the unbalance mass 4. However, the compensating weight could also be of any other shape, for instance a closed eccentric body. It is essential that the compensating weight 2 is fastened on the shaft 1 with an elastic bushing 5 interposed. Here, the elastic bushing 5 is in the form of a cylinder jacket, which is cut out in the window 6. It is made from a material which is elastic above all in the circumferential direction, preferably a rubber-like plastic. The connection between the elastic bushing 5 and the surface parts bearing against it of the shaft 1 and the compensating weight 2 can take place in the usual way by bonding or vulcanizing.

Figure 2:
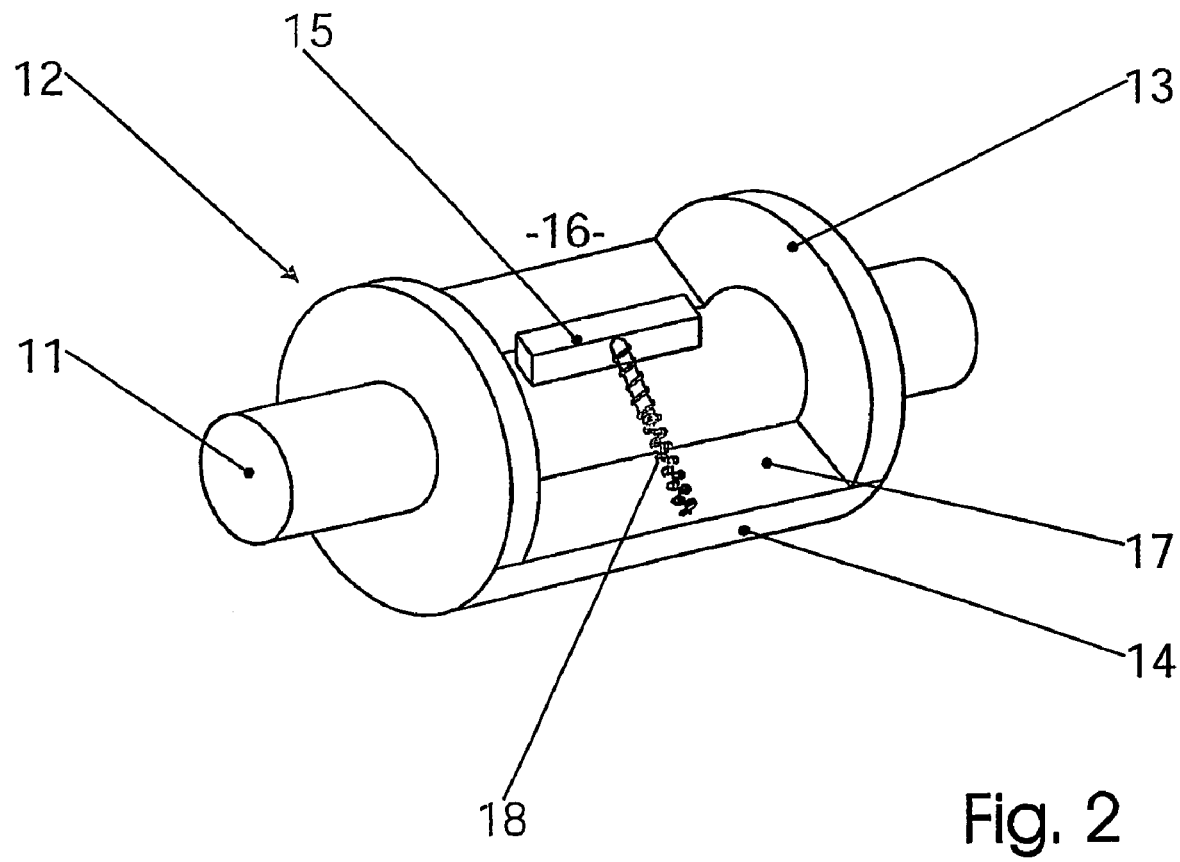
FIG. 2 shows a second embodiment in an axonometric view.

In FIG. 2, similar parts are provided with a reference number increased by ten. The compensating weight 12 with its edge zones 13 and its eccentric unbalance mass 14 again has a window 16 here, which is formed by the inner surfaces of the edge zones 13 and the delimiting surfaces of the eccentric unbalance mass 14. In this window, a featherkey-shaped stop 15 can be seen, which is part of the shaft 11 or is connected firmly to it. Arranged between this stop and the delimiting surface 17 is a spring damper unit 18, illustrated only diagrammatically, which counteracts the relative rotation between the compensating weight 12 and the shaft 11 in one direction, a further such spring damper unit which acts in the other direction of rotation, also being present but not visible.

Figure 3:
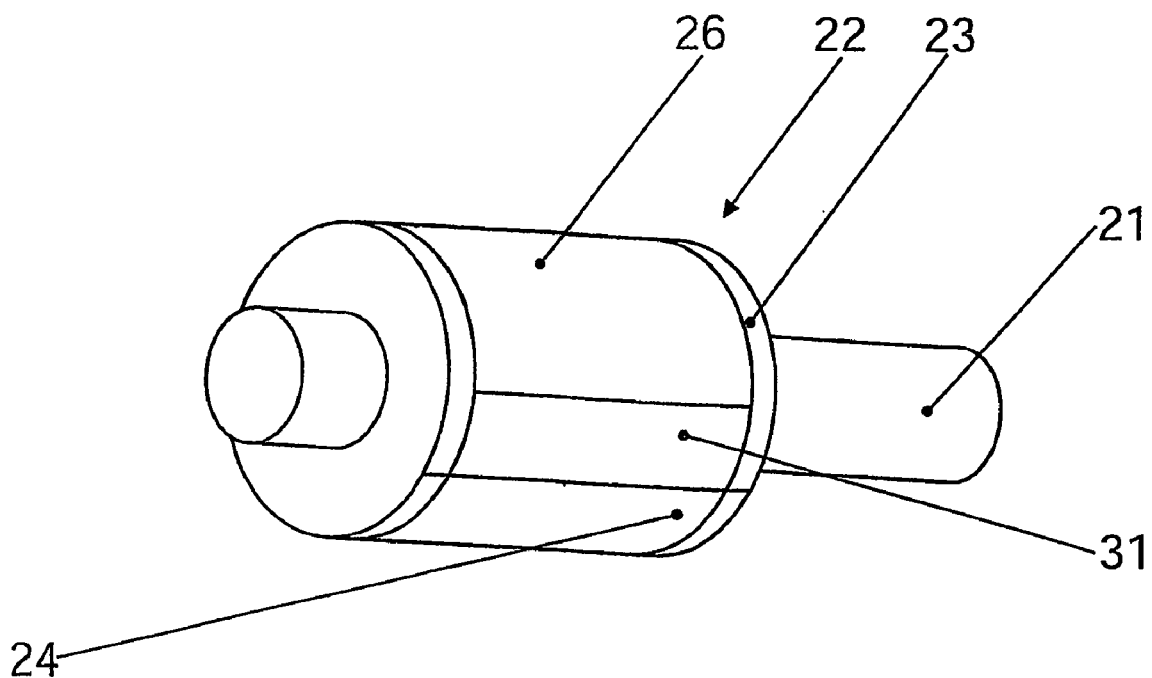
FIG. 3 shows a third embodiment in an axonometric view.
Figure 4:
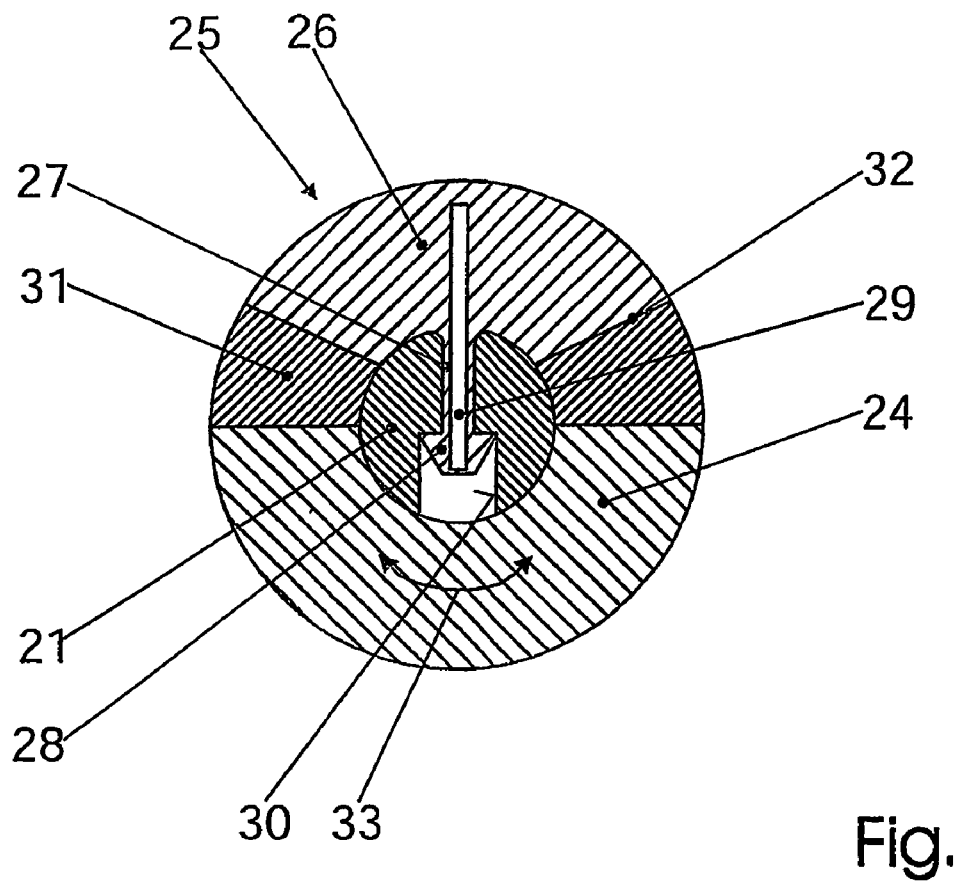
FIG. 4 shows a section along A-A in FIG. 3.

In FIG. 3 and FIG. 4, where the reference numbers are increased by twenty, the window designated by 16 in FIG. 2 is filled by an elastic element 25. This is made from a light material, preferably a plastic, and consists of a hard part 26, which extends over the entire axial length of the compensating weight 22, and soft parts 31 on both sides of the hard part. Hard and soft pars can be injection-molded together in one piece. For fastening the elastic element 25 on the shaft 21, the latter has a stepped transverse bore 30. The hard central part 26 of the elastic element 25 has a radially inwardly projecting root 27, which ends in a hook-shaped enlargement 28. During assembly of the compensating shaft, this root 27 is inserted into the transverse bore 30 until its hook snaps in the enlargement of the transverse bore and is then fixed by means of a metal reinforcement 29. The soft part 31 of the elastic element 25 can be connected to the delimiting surface 32 of the unbalance mass. The elastic element 25 fills the window entirely, so that the compensating weight has a cylindrical outer contour. Furthermore, the directional arrow 33 on both sides in FIG. 4 indicates that the eccentric unbalance part 24 with the edge zones 23 can rotate out of the position shown in both directions in relation to the shaft 21.

The damping elastic part, whether it is a spring damper unit 18 or an elastic element 25, is constructed in such a way that it allows rotation of the unbalance mass by up to ten angular degrees in both directions in relation to its illustrated position. If this maximum amplitude is reached, the hard part 26 of the elastic element 25 becomes active and prevents further rotation. However, such large rotations take place only during abrupt changes in rotational speed, whereas the very rapid small changes in rotational speed caused by the rotational irregularity of the engine are taken up completely, and the compensating weight rotates at an entirely constant rotational speed.

It is noteworthy that even a rotation of the compensating weight by the full amplitude of ten angular degrees results in only a brief reduction in the compensating effect of no more than 1½%.

All in all, thanks to the arrangement according to the invention, the tolerances both of the teeth of the driving toothed wheels and also of other parts can be made less close and the loading of the toothed wheels or chain wheels driving the compensating shaft is reduced considerably. A marked increase in quiet running is nevertheless achieved.

The invention claimed is:

1. A compensating shaft for reciprocating piston engines comprising at least one compensating weight with an eccentric center of gravity, the compensating weight being connected torsionally elastically to the compensating shaft, wherein the compensating weight surrounds the compensating shaft with its edge zones and a window is formed therebetween in the longitudinal direction, wherein an elastic element is disposed within the window and is supported on the compensating shaft in the circumferential direction, and wherein the elastic element is made of plastic and has an elasticity which is graduated in the circumferential direction including a hard central part interconnected with the compensating shaft which is firm in the circumferential direction, and a soft part bearing against the compensating weight.

2. The compensating shaft as claimed in claim 1, wherein the plastic part is manufactured by injection molding comprising a root projecting into a transverse bore of the shaft for interconnection therewith.

3. The compensating shaft as claimed in claim 2, wherein the root comprises a metal reinforcement.

4. A compensating shaft for a reciprocating piston engine, said compensating shaft comprising:
a compensation weight having an eccentric center of gravity and a longitudinal window;
a shaft rotatably supporting said compensation weight and having a variable rotational speed; and
a spring damper disposed within said window and elastically coupling said compensation weight and said shaft and enabling relative rotation between said shaft and said compensation weight when said rotational speed of said shaft changes, and wherein said spring damper includes a spring having a first end communicating with said shaft and a second end communicating with said compensation weight, said spring biasing relative rotation between said shaft and said compensation weight, said spring damper further includes a stop having a first end fixed to said shaft and a second end such that communication between said second end and said compensation weight limits relative rotation between said compensation weight and said shaft when said rotational speed of said shaft changes.

5. A compensating shaft for a reciprocating piston engine, comprising:
a compensation weight having an eccentric center of gravity and a longitudinal window;
a shaft rotatably supporting said compensation weight and having a variable rotational speed; and
a damping member disposed within said window and elastically coupling said compensation weight to said shaft and enabling relative rotation between said shaft and said compensation weight when said rotational speed of said shaft changes, said damping member is made of an elastic material and includes a first portion having a first elasticity and a second portion having a second elasticity, said first portion is coupled to said shaft and said second portion is disposed between said first portion and said compensation weight.

6. The compensating shaft of claim 5 further including a third portion having a third elasticity, said third portion is disposed between said first portion and said compensation weight opposite second portion.

7. The compensating shaft of claim 6 wherein said third elasticity is equal to said second elasticity.

8. The compensating shaft of claim 5, wherein said compensation weight has a closed cylindrical contour when said damping member is disposed in said window.

9. The compensating shaft of claim 5, wherein said first elasticity is less than said second elasticity.

10. A compensating shaft for a reciprocating piston engine, comprising:
a compensation weight having an eccentric center of gravity and a longitudinal window;
a shaft rotatably supporting said compensation weight and having variable rotational speed; and
a damping member disposed within said window and elastically coupling said compensation weight to said shaft for enabling relative rotation therebetween in response to changes in said rotational speed of said shaft, said damper member is made of an elastic material and includes a first portion having a protrusion disposed in an aperture formed in said shaft for coupling said damper member to said shaft.

11. The compensating shaft of claim 10 wherein said damper member further includes a second portion connected to said first portion and arranged to engage a surface of said compensation weight within said window.

12. The compensating shaft of claim 11 wherein said second portion has a second elasticity which is greater than said first elasticity of said first portion.

13. The compensating shaft of claim 12 wherein said damper member further includes a third portion connected to said first portion opposite said second portion and arranged to engage a second surface of said compensation weight within said window.

14. The compensating shaft of claim 13 wherein said third portion has a third elasticity which is greater than said first elasticity of said first portion.

15. The compensating shaft of claim 10, wherein said damping member further includes a reinforcing pin disposed in said protrusion.

16. The compensating shaft of claim 15, wherein said reinforcing pin is a metal reinforcing pin.

* * * * *